United States Patent [19]

Hsu

[11] Patent Number: 5,665,258
[45] Date of Patent: Sep. 9, 1997

[54] VERTICAL ELECTRIC-HEATING OVEN

[75] Inventor: Tony Hsu, Yung-Kang, Taiwan

[73] Assignee: Lundar Electric Ind. Co., Ltd., Tainan Hsien, Taiwan

[21] Appl. No.: 442,341

[22] Filed: May 16, 1995

[51] Int. Cl.$^6$ .................... F24C 7/04; F24C 15/16
[52] U.S. Cl. .............. 219/388; 219/386; 219/405; 99/421 P; 99/421 V; 99/427; 392/425
[58] Field of Search ................. 219/388, 385, 219/386, 391, 405; 99/419, 421 V, 421 P, 426, 427, 443 R; 392/416, 423, 425, 428; 126/338

[56] References Cited

U.S. PATENT DOCUMENTS

| | | | |
|---|---|---|---|
| 1,819,301 | 8/1931 | Noble | 99/421 V |
| 2,049,481 | 8/1936 | Walterspiel | 99/421 V |
| 2,687,080 | 8/1954 | Dorin | 99/421 P |
| 2,831,420 | 4/1958 | Radman | 99/427 |
| 3,221,638 | 12/1965 | Wickenberg | 99/421 P |
| 4,735,135 | 4/1988 | Walker | 99/421 V |
| 4,918,275 | 4/1990 | Okamoto et al. | 99/443 R |
| 5,034,587 | 7/1991 | Takagi | 99/443 R |

FOREIGN PATENT DOCUMENTS

| | | | |
|---|---|---|---|
| 1007319 | 12/1949 | France . | |
| 88446 | 12/1966 | France | 99/421 P |
| 833677 | 3/1952 | Germany | 99/421 V |
| 646109 | 9/1962 | Italy | 99/421 V |
| 2-10027 | 1/1990 | Japan | 392/416 |

*Primary Examiner*—Teresa J. Walberg
*Assistant Examiner*—J. Pelham
*Attorney, Agent, or Firm*—Morton J. Rosenberg; David I. Klein

[57] ABSTRACT

A vertical electric heating oven is provided which includes an oven body incorporating a shell, a reflecting container, a door, a base, and an electric heater, a driver, a rotary rack, and a vertical rack assembly. The electric heater is located vertically in the oven. The driver is placed in the base and has an elongated axle extending out from the reflecting bottom. The reflecting bottom has a dish with the axle extending through its center. The dish provides a space containing the rotary rack, and the rack assembly is placed on the rotary rack and connected to the axle of the driver. Therefore, the horizontal thermal radiation of the electric heater is coordinated with the rack assembly on the rotary rack, which is connected to the driver to roll through 360 degrees to provide full even baking conditions.

1 Claim, 9 Drawing Sheets

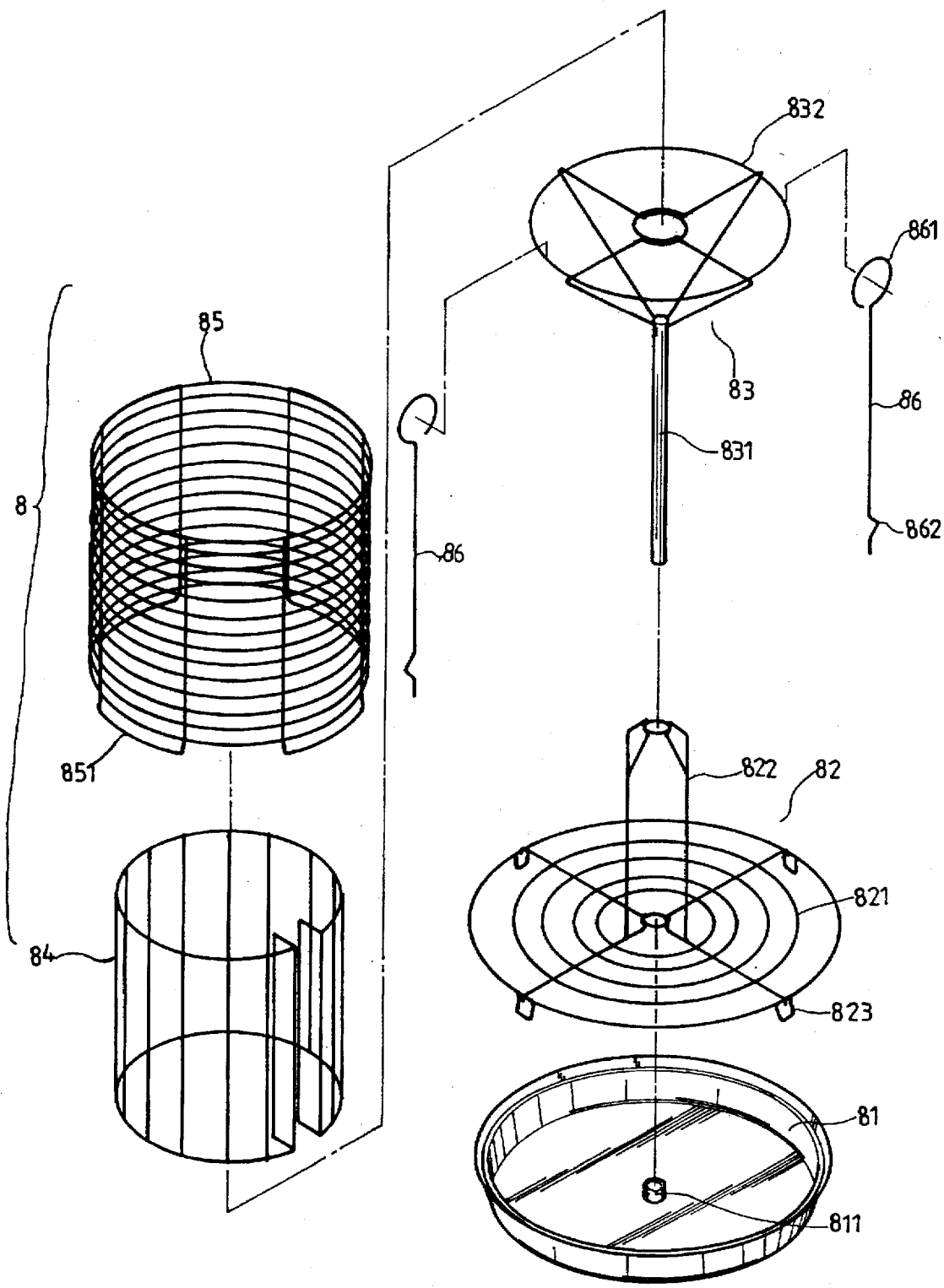
F I G. 2

5,665,258

VERTICAL ELECTRIC-HEATING OVEN

BACKGROUND OF THE INVENTION

1. Field of the Invention

The present invention relates to a vertical electric heating oven and more particularly to an oven having a vertical source of electric heating, a larger longitudinal space and even heating.

The electric heating oven, because of its simple structure and its price being well accepted by many persons, has enjoyed much popularity.

2. Prior Art

Generally, FIG. 9 shows a conventional electric heating oven which includes a case A with a door (not shown) located inside of the case. A rack B is disposed at the bottom of the case. An electric heater C (in some cases, the electric heaters are placed on both the top and bottom of the case) is located at one side of the case. An exhaust cycle set D is installed to exhaust heat to the top of the case, and to produce a thermal convection cycle to provide even heating everywhere in the container, to bake food fully.

After careful detailed analysis of the above structure, we find that exhaust convection cycling produces an even heating environment in the space of the container. However, the food placed on the rack has its bottom surface near the electric heater. In such a case, if the food is not turned over during baking, the bottom of the food absorbs much more heat than elsewhere, so it becomes cooked earlier than it does elsewhere. Often, part of the food becomes burnt, or to avoid this, during baking the food needs to be turned over frequently, thus causing inconvenience.

SUMMARY OF THE INVENTION

It is therefore an object of the present invention to provide a vertical electric heating oven, which applies an electric heater disposed vertically at the backside of the container. A driver set is located at the bottom of the oven, which can drive a food laden rack through 360 degree rotations and by heating from a vertically directed electric heater can transfer heat evenly to all sides of the food.

BRIEF DESCRIPTION OF THE DRAWINGS

FIG. 2 is an exploded view of the rack assembly of the present invention;

DETAILED DESCRIPTION OF THE PREFERRED EMBODIMENT

Figure 1:
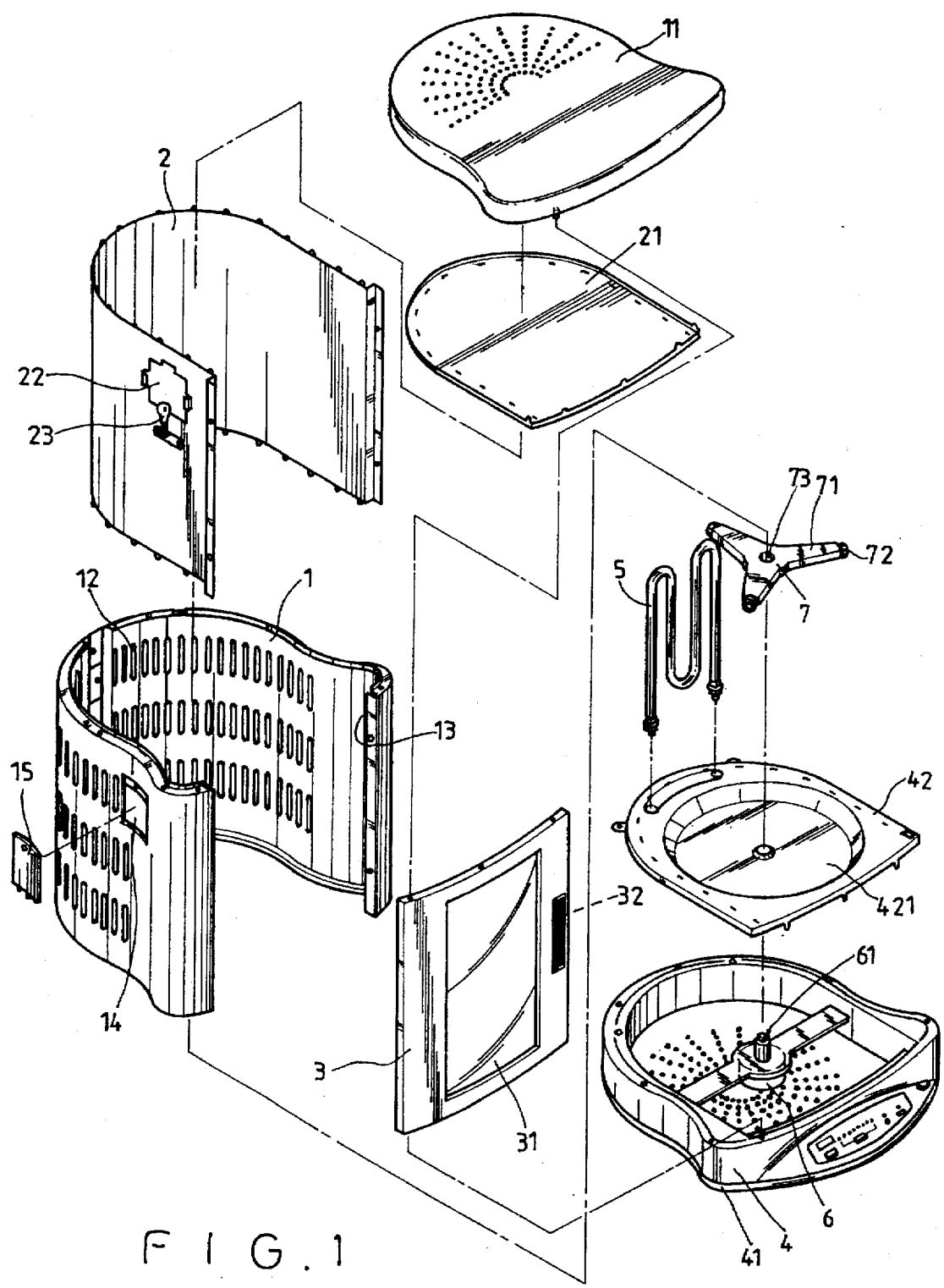
FIG. 1 is an exploded view of the present invention.
Figure 3:
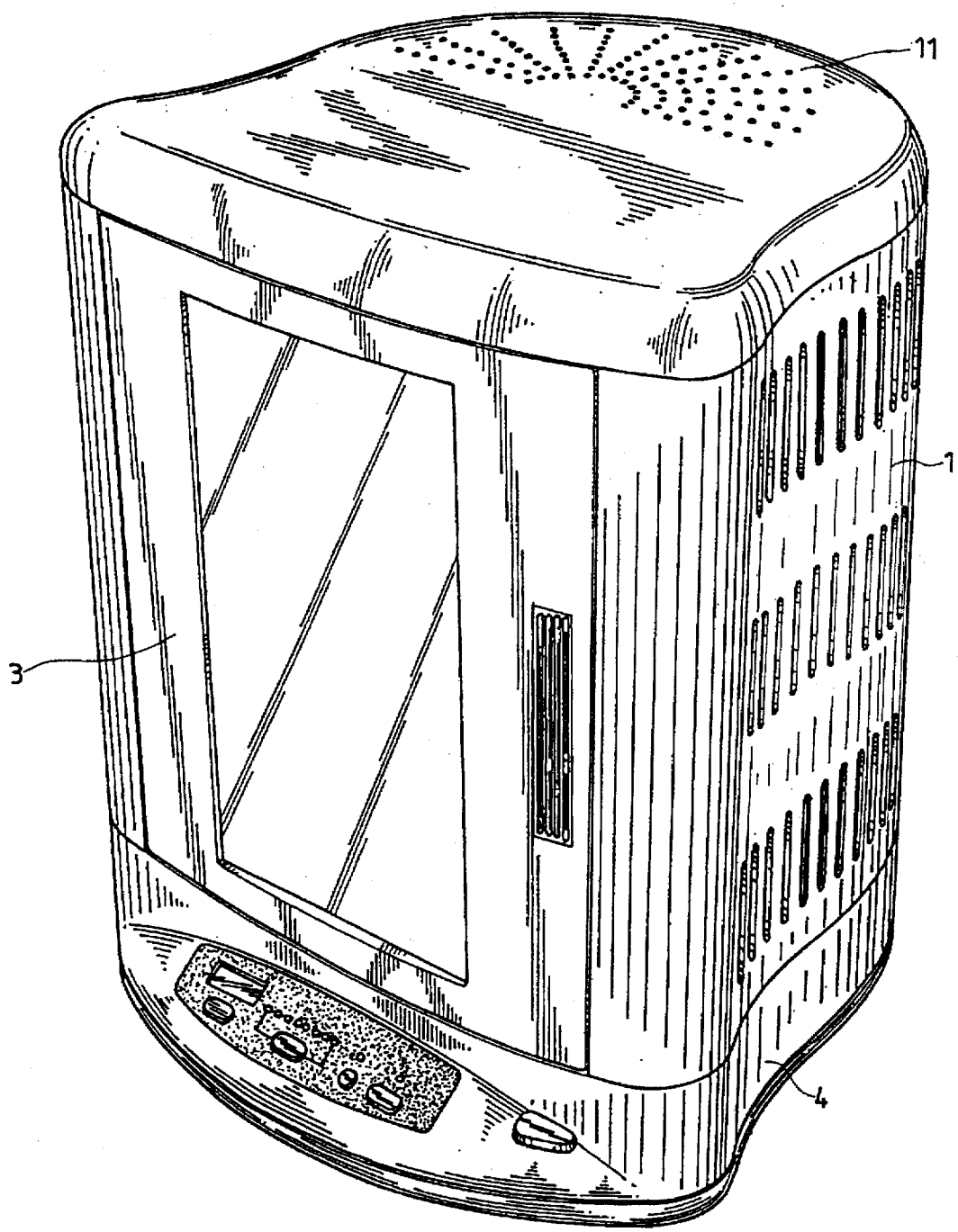
FIG. 3 is an exterior perspective view of the present invention.

Referring now to FIGS. 1, 2 and 3, there is shown, an electric heating oven that includes a shell 1, a reflecting container 2, a door 3, a base 4, an electric heating unit 5, a driver 6, a rotary rack 7 and a rack assembly 8.

The shell 1, which is a curved molded shell, is made of heat resistant plastic material, and has a cover 11 at its top edge, and a plurality of elongated holes 12 formed in it. The front portion of both sides of the shell have a cabinet 13 formed therein. In one side, the respective cabinet has a hole 14 formed therethrough with a covering 15 disposed thereon to provide access to a lamp 23.

The reflecting container 2 has a U-shaped metal plate with a reflector cover 21 at the top. Corresponding to the hole 14 of the shell 1, the reflecting container 2 has a slot 22, with the lamp 23 disposed between the shell and reflecting container.

The base 4 is a curved base structure which fits to the shell, and has a bottom 41. The base 4 holds a reflecting bottom 42 on its top side, and positioned perpendicular thereto, a vertically directed electric heater 5 is disposed at a rear portion of the reflecting bottom 42. A dish 421 is provided at the center of the reflecting bottom 42 to provide a place for the rotary rack 7, which rack is rotatively coupled to an axle 61 through an opening formed through the center of the dish 421. Additionally, the front of the base 4 has a control panel 9.

The electric heater 5 has an M-shaped electric heating tube. The driver 6, which is a motor, is fixed at the bottom 41 of the base 4.

The rotary rack 7 includes a level-expanding trivet formed by bearer 71, the ends of the bearer 71 each having a pivoted roller 72 respectively coupled thereto. The center of the rack 7 has a hole 73 formed therethrough.

The rack assembly 8, as shown in FIG. 2, includes a dish 81, a supporter 82, a suspension 83, and inner trellis 84, a trellis 85 and several suspension members 86. The dish 81 is a round container having a sunken hole 82 disposed at the center of the bottom of the dish. Supporter 82 includes a round rack 821, a perpendicularly disposed shelf 822 located in the center of the round rack, and holders 823 extending down from the edge of rack 821, to fit in the dish 81 and hold the rack 82 smoothly therein. Suspension rack 83 includes a prop 831, at the top of prop 831, a cone-shaped suspension loop 832 is provided to suspend the suspension members 86. The inner trellis 84 is an open annular trellis. The trellis 85 is an annular trellis, and has a holder 851 located at the bottom edge of trellis 85 for holding it onto the rack 821 at the base of supporter 82. Each suspension member 86 is a pole, one end of which is formed in a loop 861, and the other has a bend 862 formed therein.

Figure 4:
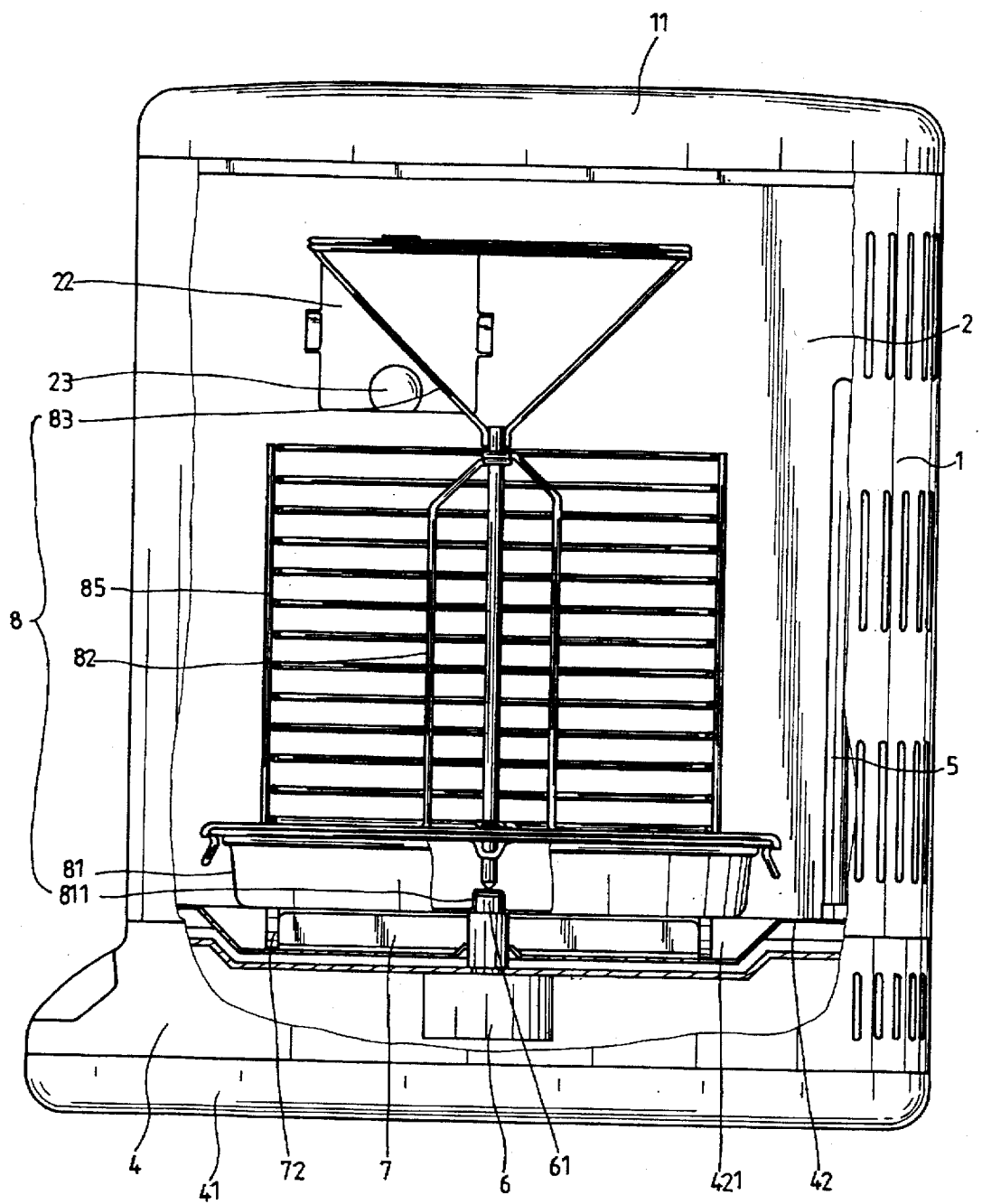
FIG. 4 is a partially sectioned view of the present invention.
Figure 5:
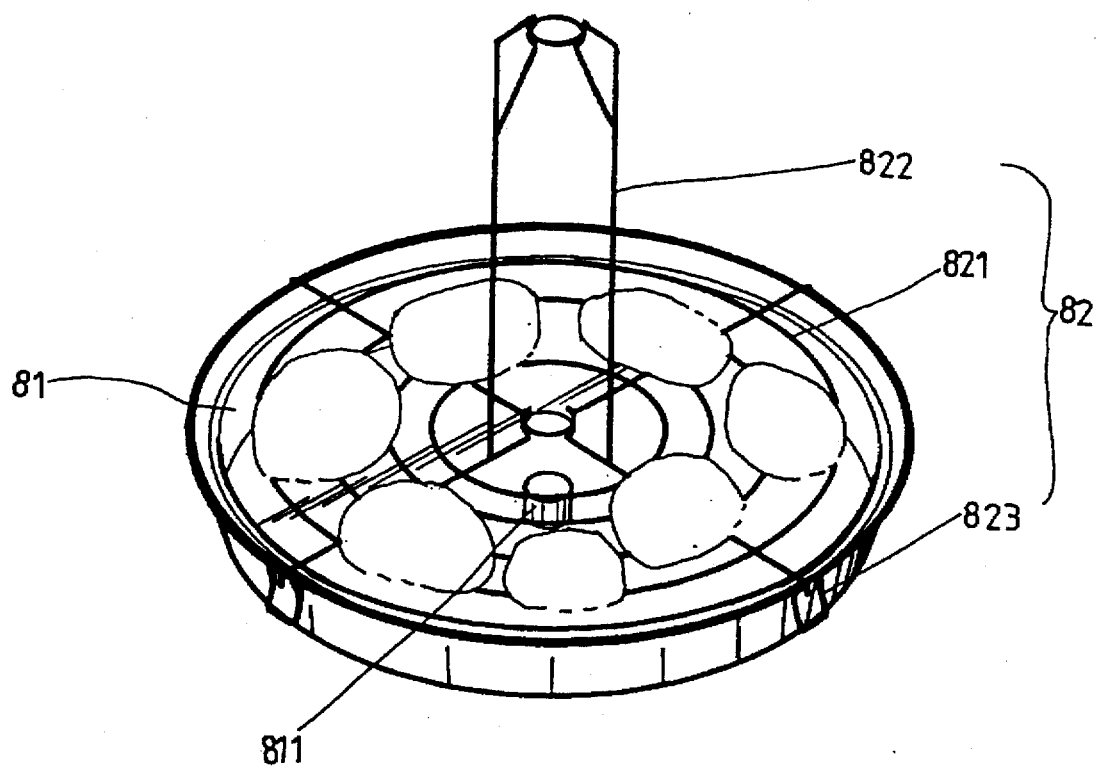
FIG. 5 is a perspective view of one configuration of the rack of the present invention.
Figure 6:
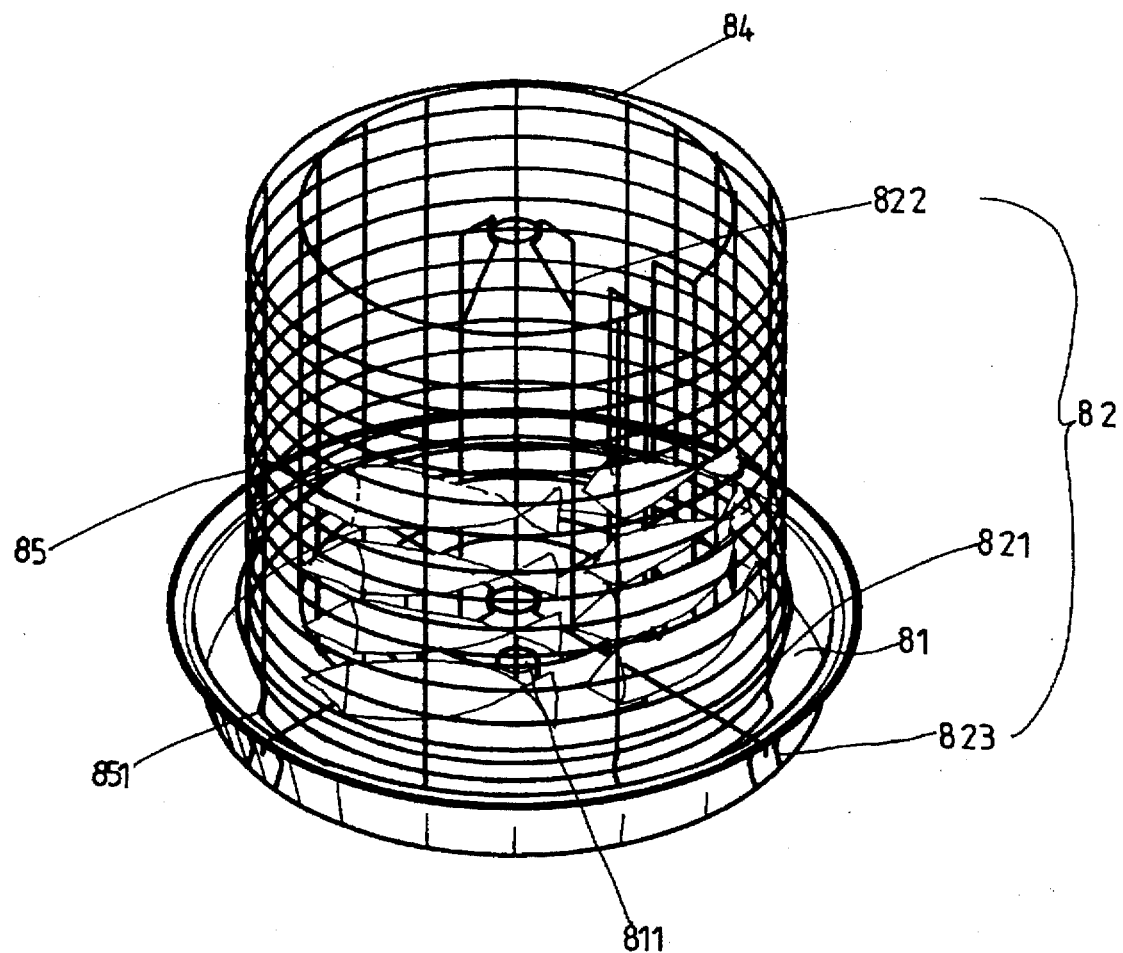
FIG. 6 is a perspective view of another configuration of the rack of the present invention.
Figure 7:
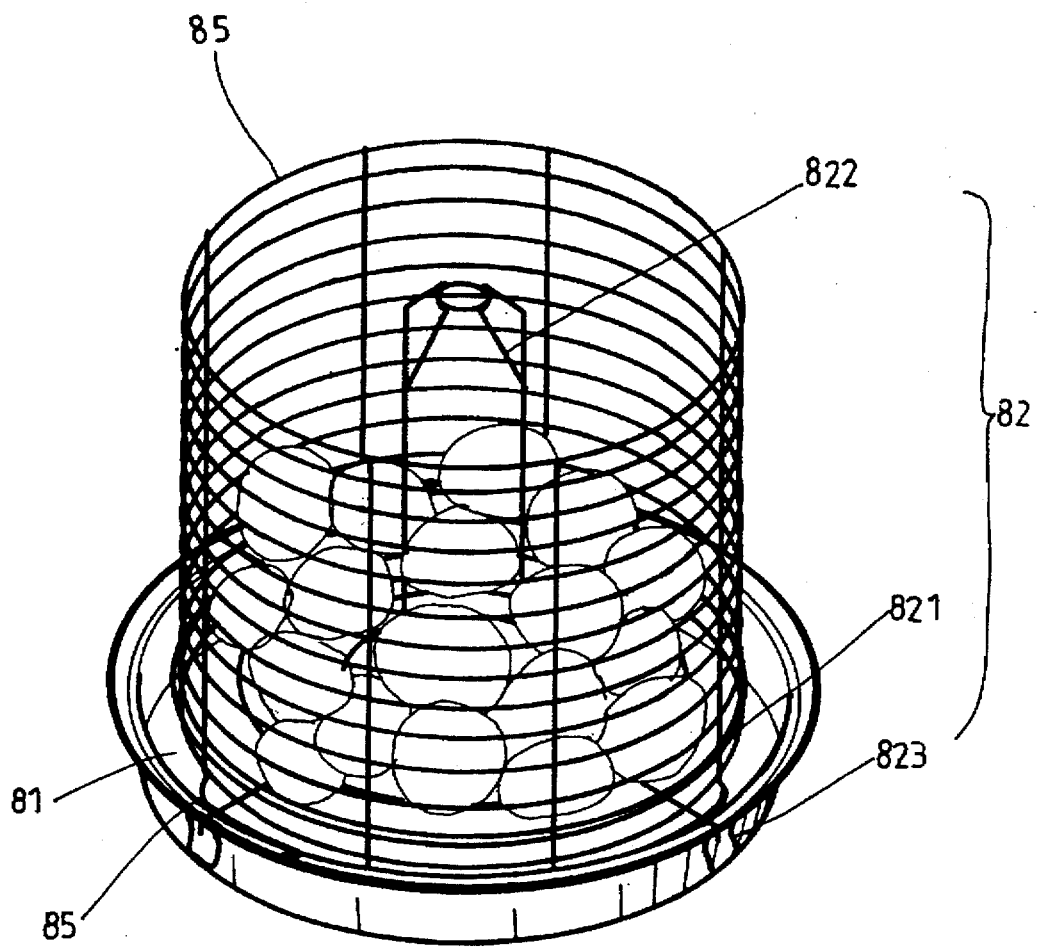
FIG. 7 is a perspective view of another configuration of the rack of the present invention.
Figure 8:
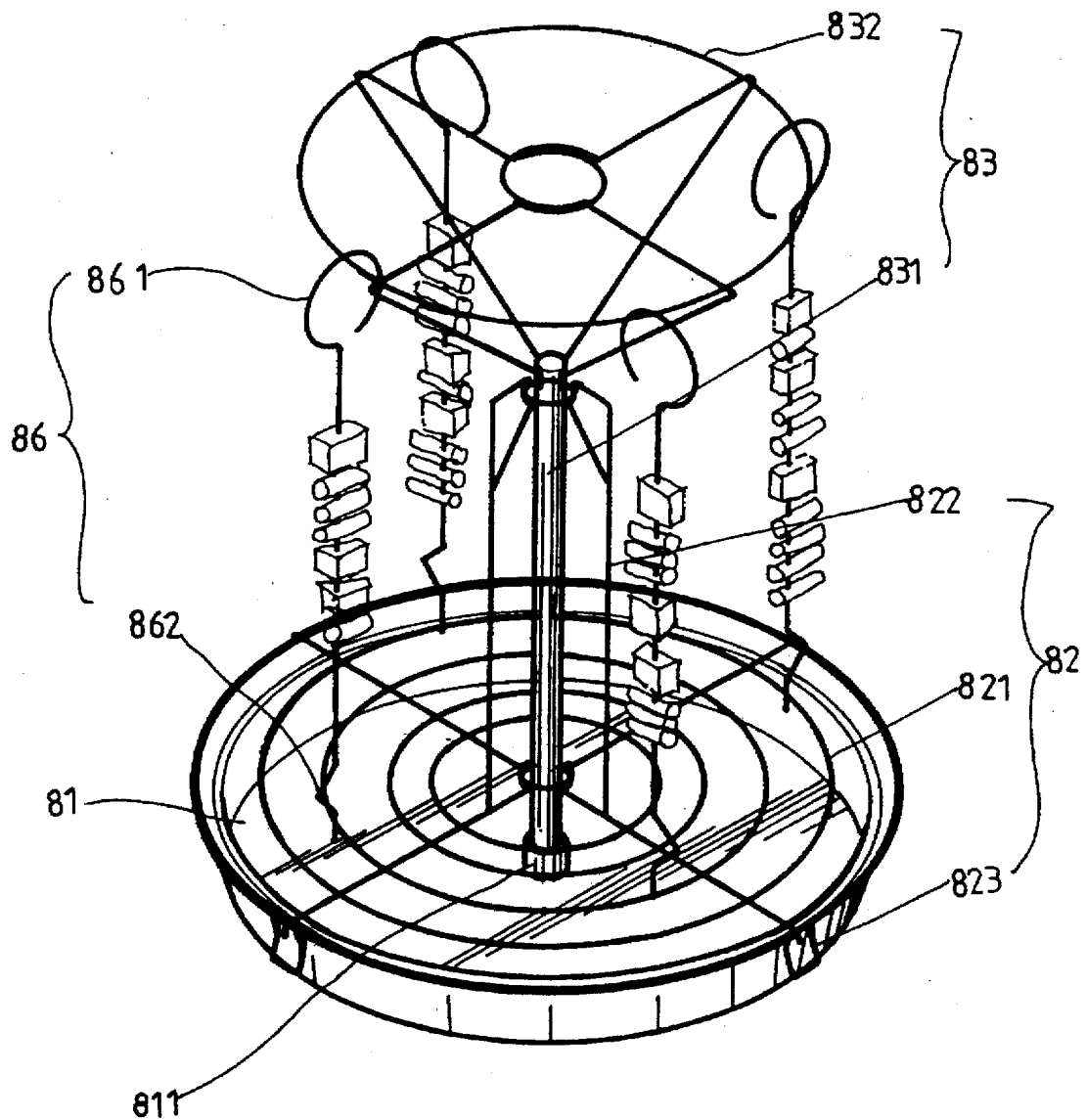
FIG. 8 is a perspective view of another configuration of the rack of the present invention; and, FIG. 9 is a cross-sectional elevation view of the structure of a conventional electric heated oven.
Figure 9:
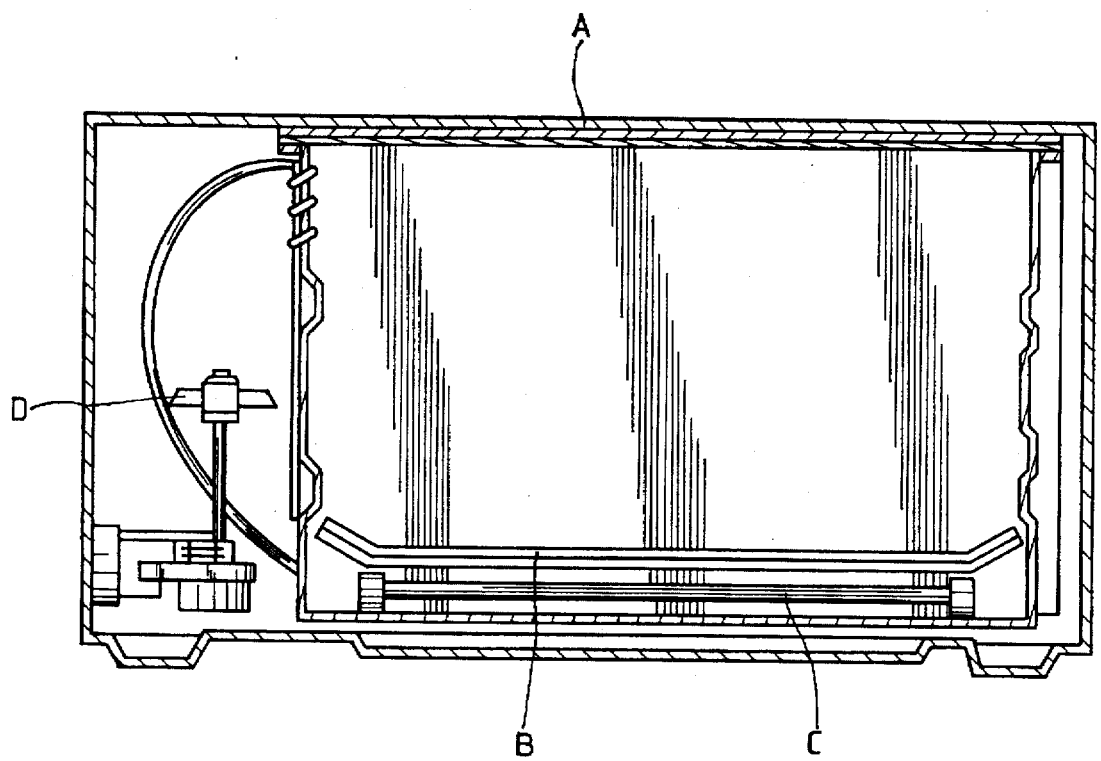

With further reference to FIG. 4, the reflecting container 2 is affixed to the shell 1 at opposing side edges thereof, the reflecting container being the combination of the U-shaped reflector with reflector 21 and the cover 11 coupled to opposing ends thereof. The base 4 is affixed to the bottom of the shell assembly. The opening at the front side of the shell assembly is closed by a door 3 pivotally coupled on one side, the other side of the door 3 has a latch 32 for locking the door to the shell assembly and forming an oven body having a sealed baking space. At the back of the base 4 and perpendicular thereto, the electric heater 5 is positioned to radiate heat horizontally. The elongated axle 61 of the driver 6, located in the base 4, extends out from the center of the dish 421 of the reflecting bottom 42, disposed above base 4. The axle 61 extends into the center of the dish 81 of the rack assembly 8 to rollingly drive it with the rotary rack 7 prepositioned in the dish 421 of the reflecting bottom 42 of the base 4.

Referring to FIGS. 5–8, the rack assembly 8 of the present invention can be combined in many different configurations, for many different purposes. One such configuration is to put the supporter 82 into the dish 81, for baking flaky food put on the bottom rack 821 of the supporter 82. Another configuration is formed by mounting one or both the inner trellis 84 and trellis 85 on the supporter 82, the trellis assembly surrounding the central shelf 822 of the supporter 82 to form a circularly shaped or annularly shaped space respectively, for putting food like fish, potato, etc., in. Yet another configuration is formed by inserting the suspension rack 83 into the central shelf 822 of the supporter 82 with the prop 831, thereby providing the suspension loop 832 of the suspension rack 83 for suspending suspension members 86 to barbecue food.

Referring back to FIG. 4, one feature of the oven is that the combination of the vertically directed electric heater 5 and the vertical rack assembly 8 provide a unique baking space. Another unique feature is the application of an interior reflecting structure to provide an oven space with even baking. Additionally, the driver 6 in the base 4 rotates the rack assembly 8 with the rotary rack 7 rolling on a level surface through 360 degrees, to provide no angular segment which is not exposed to the heating element, making the food bake fully and evenly. Further, it eliminates the need to turn food over during baking, making it easy and convenient to use.

I claim:

1. A vertical electrically heated oven, comprising:

a substantially U-shaped shell having longitudinally spaced top and bottom ends and a pair of side edges, said top end having a cover secured thereto;

a base having an upper end affixed to said bottom end of said shell;

reflecting means coupled to said base interior to said shell for defining a baking space and reflecting heat therein, said reflecting means including (a) a bottom reflector overlaying said base and secured thereto, said bottom reflector having a centrally disposed recessed dish portion with an aperture formed through a central portion thereof, (b) a U-shaped reflector coupled respectively on opposing sides to said pair of side edges of said shell and having longitudinally spaced top and bottom ends, said bottom end of said U-shaped reflector being coupled to said bottom reflector, and (c) a top reflector secured to said top end of said U-shaped reflector;

an electric heater extending longitudinally within said baking space, said electric heater being disposed adjacent a rear portion of said bottom reflector;

a door having one side pivotally coupled to a first of said pair of side edges of said shell, said door including a latch on an opposing side thereof for coupling with a second of said pair of side edges of said shell for enclosing said baking space;

a rotary driver disposed with in said base and having a shaft extending through said aperture of said bottom reflector;

a level-expanding bearer disposed within said recessed dish portion of said bottom reflector and having a plurality of end portions, said level-expanding bearer having a central through opening formed therein for passage of said shaft therethrough and having a plurality of rollers respectively coupled to said plurality of end portions; and, a rack assembly disposed on said plurality of rollers and coupled to said shaft for rotation therewith to rotate food placed thereon within said baking space and provide even baking of the food, said rack assembly including:

(1) a dish member coupled to said shaft and disposed on said plurality of rollers;

(2) a round rack coupled to said dish, said round rack having a support section extending vertically from a central portion thereof;

(3) a first trellis member releasably securable to said round rack to extend vertically therefrom to define a circularly shaped cooking space therein;

(4) a second trellis member disposed on said round rack concentrically within said circular cooking space to define an annular cooking space therebetween; and, (5) a suspension rack releasably coupled to said round rack, said suspension rack having (a) a cone-shaped suspension loop coupled to said support section of said round rack for rotation therewith, and (b) a plurality of suspension members releasably coupled to said suspension loop.

* * * * *